Figure 1:
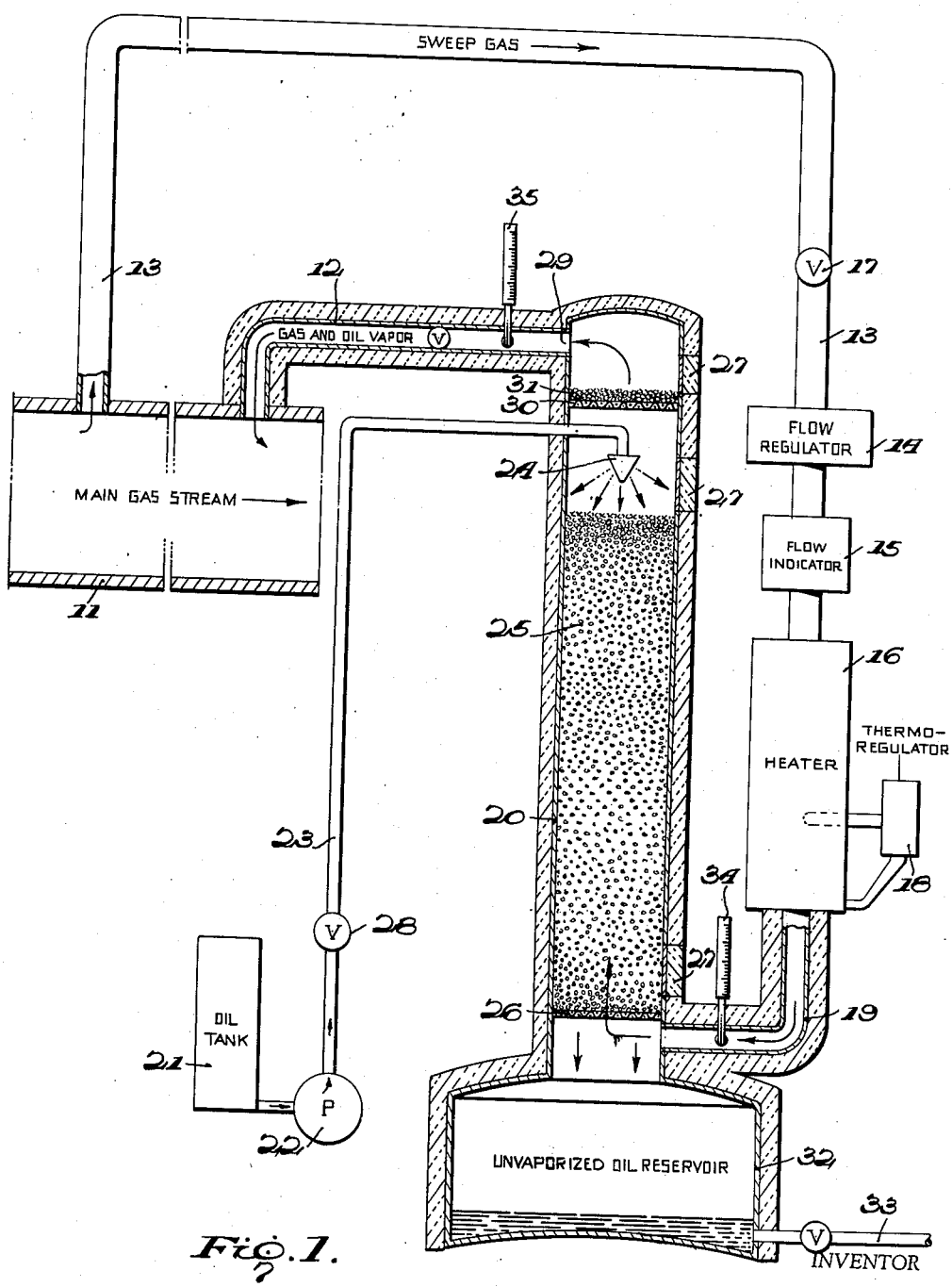

Aug. 10, 1954  O. W. LUSBY  2,686,112
METHOD AND APPARATUS FOR PRODUCING OIL FOG IN GAS MAINS
Filed Oct. 30, 1950  2 Sheets-Sheet 1

INVENTOR
Oscar W. Lusby.
BY Cameron, Kerkam & Sutton
ATTORNEYS

Aug. 10, 1954

O. W. LUSBY 2,686,112

METHOD AND APPARATUS FOR PRODUCING OIL FOG IN GAS MAINS

Filed Oct. 30, 1950

2 Sheets-Sheet 2

INVENTOR
Oscar W. Lusby
BY Cameron, Kerkam + Sutton
ATTORNEYS

Patented Aug. 10, 1954

2,686,112

UNITED STATES PATENT OFFICE 2,686,112

METHOD AND APPARATUS FOR PRODUCING OIL FOG IN GAS MAINS

Oscar W. Lusby, Baltimore, Md., assignor to Consolidated Gas Electric Light and Power Company of Baltimore, Baltimore, Md., a corporation of Maryland Application October 30, 1950, Serial No. 192,917

12 Claims. (Cl. 48—190)

This invention relates to the production of oil fog for the maintenance of oil-wet conditions in gas mains, and is particularly directed to a method and apparatus for producing a mixture of oil vapor and hot gas which, upon introduction into a stream of combustible fuel gas flowing in a main, will create a stable oil fog therein.

It is generally recognized by the gas industry that an oil coating over the interior of the mains is desirable in that it prevents dust from blowing in the mains, stops leaks at pipe joints and in washers, and minimizes the removal by iron rust of odorant added to the gas. Although it has been attempted to create an oil fog in gas mains by atomizing the oil directly into the gas under pressure, this method has not proved practical because the fog thus produced is not stable. At the present time, the preferable practice for producing a stable oil fog is to introduce a stream of hot sweep gas containing oil vapors into a stream of relatively cold gas, thereby suddenly cooling and diluting the hot gas and condensing the oil vapor.

The conventional procedure for obtaining the desired mixture of hot gas and oil vapor is to pass the sweep gas over or through a body of hot oil contained in a suitable heated pot. This method has many disadvantages which are well recognized by the industry. For example, in order to control the amount of oil fog produced by the use of this method, it is necessary to control quite accurrately the oil temperature, the amount of gas passing over or through the oil, and the level and condition of the oil in the heated pot. However, these controls are difficult to maintain with the result that, as a practical matter, there is no effective control of the rate of oil fog production. An additional, and perhaps more serious, disadvantage of the previously accepted practice is that the oil becomes carbonized on the heating surfaces of the pot and thus adversely affects both the efficiency of heat transfer and the fogging rate. Another disadvantage is that any heavy ends which the oil may contain accumulate in the pot and decrease the vapor pressure of the heated oil, which in turn decreases the amount of oil vapor carried by the gas. In order to maintain a constant fogging rate with the changing composition of the oil in the pot, it is necessary to continually increase the oil temperature as the oil residue accumulates, and when this residue is drained from the pot and fresh oil is added, the temperature must be readjusted to avoid fogging too much oil.

It is therefore the principal object of the present invention to provide an efficient, easily controlled method and apparatus for producing an oil fog of unusual stability in a gas stream which will avoid the disadvantages inherent in the practices of the prior art.

Another object is to provide a new and improved system for producing an oil fog in a stream of combustible fuel gas wherein the rate of oil fog production may be accurately controlled solely by controlling the rate at which the oil is added to the system, and wherein the heat required for vaporization of the oil is supplied by direct heating of the sweep gas before it is brought into contact with the oil so that heating of the oil in a pot and the consequent disadvantages of carbonization and varying composition of the oil are avoided.

A further object is to provide a novel oil fogging procedure wherein the proportions of sweep gas and oil are adjustable so as to permit any desired degree of saturation of the gas by the oil vapor, and wherein, for any given adjustment, the system may be operated continuously with the assurance that the results produced will be of constant character.

These and other objects will appear more fully upon consideration of the detailed description of the embodiments of the invention which follows. In this connection, it is to be expressly understood that the specific forms of oil fogging apparatus described and shown in the accompanying drawings are illustrative only and are not to be construed as representing the full scope of the invention, for which latter purpose reference should be had to the appended claims.

Figure 2:
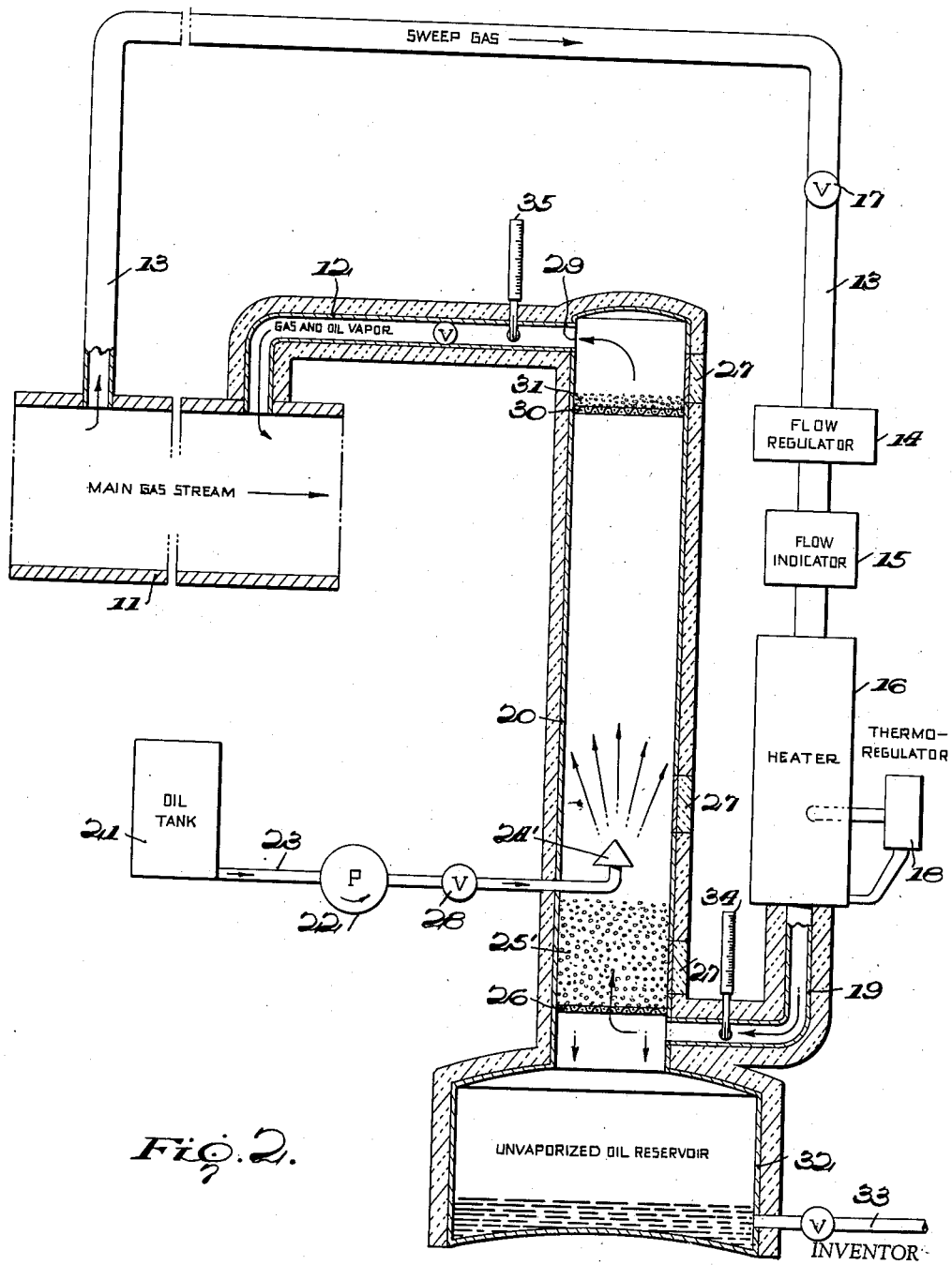

Referring now to the drawings, wherein corresponding elements in the two views are indicated by like reference characters:

Fig. 1 is a generally diagrammatic view of one form of oil fogging apparatus embodying the present invention which is especially well adapted for the addition of relatively small quantities of oil fog to a gas main; and Fig. 2 is a similar view of another system embodying the invention which is particularly useful for large scale operations.

In the system illustrated in Fig. 1, the conduit 11 represents a gas main through which flows the primary stream of combustible fuel gas in which it is desired to produce an oil fog by the introduction into said stream through an insulated pipe 12 of a secondary stream of relatively hot sweep gas and oil vapor. The sweep gas for the secondary stream is withdrawn from the main gas line 11 through a pipe 13 connected thereto at a suitable point upstream of the point of delivery of pipe 12. If desired, a pump may be used to withdraw gas from line 11, or an orifice may be installed in the line between the points of connection of pipes 12 and 13. After passing through a flow regulator 14 and flow indicator 15, the sweep gas is delivered into a heater 16 where it is heated in any desired manner, as by steam, electricity or combustion of part of the gas itself, but without any material change in its composition. The flow regulator 14 may be any suitable device for adjustably controlling the rate of flow of gas, such as a standard spring-loaded, adjustable pressure regulator employing a flexible diaphragm, while the flow indicator 15 and heater 16 may likewise be selected from a variety of commercially available devices of the desired character. The sweep gas supply line 13 is also fitted with a normally open valve 17 ahead of the flow regulator 14 which is closed only when it is desired to shut down the fogging system. The heater 16 is provided with a thermoregulator 18 of any suitable construction which serves to protect the heater in case the flow of sweep gas should stop, and may also be used to control the temperature to which the gas is heated.

From the heater 16 the sweep gas passes through an insulated line 19 into the bottom portion of an insulated vaporizing tower 20 wherein a mixture of hot gas and oil vapor is formed. The oil to be vaporized is supplied from a storage tank 21 by a pump 22 and conduit 23 to a spray nozzle 24 of any suitable type located in the upper portion of the tower 20 and so arranged as to spray the oil in finely divided state downwardly onto a relatively tall column of packing 25 which is supported on a screen 26 positioned just above the level at which the line 19 delivers the heated sweep gas to the tower. In order to facilitate charging and removal of the packing, the tower 20 may be provided with a plurality of conveniently located doors 27. The tower packing 25 may be of any suitable character, such as carbon Raschig rings, to provide intimate contact of the hot gas and finely divided oil particles produced by the nozzle 24, while the height of the packing column is such that it will hold sufficient oil to ensure a practically constant fogging rate even when the oil is added to the tower intermittently in relatively small quantities.

The conduit 23 is provided with a valve 28 between the pump 22 and the nozzle 24 by which the rate of addition of oil to the tower may be controlled. If desired, however, the pump 22 may be of the adjustable metering or proportioning type, in which event the oil rate, and hence the rate of oil fog production, may be controlled by adjustment of the pump instead of the valve 28.

As the sprayed oil issuing from the nozzle 24 flows down through the packing 25 countercurrent to the upwardly flowing stream of hot sweep gas which enters the tower through the line 19, the oil is heated and vaporized by contact with the gas. The mixture of hot gas and oil vapor thus formed passes upwardly to an outlet 29 at the top of the tower 20 to which is connected the pipe 12 leading to the gas main 11. Interposed between the spray nozzle 24 and the outlet 29, supported on a suitable screen 30, is a relatively thin layer of packing 31 which serves to separate from the sweep gas and its admixed oil vapor any liquid spray that might be carried along by the gas. The stream of hot gas and entrained oil vapor leaving the tower flows through the insulated line 12 into the gas main 11 where it merges with the relatively cold primary gas stream, the resultant cooling and dilution of the secondary stream condensing the oil vapor carried thereby into minute oil droplets and forming a fine-particle stable oil fog. The unvaporized residue, consisting of the less volatile constituents of the oil, reaching the bottom of the column of packing 25 in the tower 20 drops into a reservoir 32 at the bottom of the tower and is removed from the system, without recirculation, through a valve controlled drain pipe 33.

In order to enable ready checking and control of the temperature conditions within the system, an indicating thermometer 34 is provided in the line 19 to show the temperature of the sweep gas after heating in the heater 16, and a similar thermometer 35 is provided in the pipe 12 adjacent the outlet 29 to indicate the temperature of the stream of hot sweep gas and oil vapor leaving the tower 20.

The apparatus illustrated in Fig. 1 is particularly well adapted to systems in which only relatively small quantities of oil fog are to be produced in the gas main 11, the arrangement of the spray nozzle 24 and packing column 25 ensuring intimate contact of the hot gas and oil even when the quantities of oil supplied to the tower are too small for the nozzle to effect complete distribution thereof. This embodiment of the invention may also be used when the quantities of oil required for fog production are too small to be readily controlled were the oil to be added to the tower continuously, in which event the addition of the oil may be intermittent. For example, with the structure shown, oil may be added during only ten minutes of each thirty minute period of operation, but the packing column will hold the oil sufficiently to result in a practically constant fogging rate.

Referring now to Fig. 2, the system shown therein is substantially identical in structure with that of Fig. 1 except for the arrangement of the spray nozzle and the size of the packing column in vaporizing tower 20. In this second embodiment of the invention, the volume of the packing 25' in the tower is substantially less than the amount indicated in Fig. 1, and the spray nozzle 24' is so positioned as to spray the oil upwardly in the same direction as the flow of the hot sweep gas, rather than countercurrently thereto. With this arrangement, the particles of oil which are not vaporized during their upward movement fall down through the gas stream into the relatively small column of packing 25', where some additional vaporization may take place, the ultimately unvaporized residue dropping into the reservoir 32. The apparatus of Fig. 2 is of particular utility when tthe quantities of oil fog required are sufficient to permit the continuous addition of oil to the vaporizing tower and to permit the spray nozzle to operate at sufficiently high pressures to ensure a fine spray.

In operating the systems of the present invention, the controlling factor in the method is the amount of oil per hour which it is desired to introduce into the gas main 11 in the form of fog. A flow of oil somewhat greater than this amount must be supplied to the tower 20 to allow for the nonvolatile residue discarded to the unvaporized oil reservoir 32. It is not necessary to exercise precise control of the gas temperature or flow rate, but only to insure that they are sufficiently high that the partial pressure of the oil vapor is less than that for saturation of the gas. Excessive gas temperature or rate of flow cannot produce excessive oil fog in the system as long as the rate of oil delivery to tower 20 is unchanged. The minimum values of sweep gas temperature and rate of flow which must be maintained are, of course, a function of the characteristics of the oil; i. e., the more volatile the oil, the lower the gas temperature or rate of flow may be reduced and still effect evaporation of the volatile portions of the oil. In practice, the temperature at thermometer 35 in pipe 12 at the outlet of the tower, which is the temperature control point, should be maintained within the range from 250° to 450° F., depending upon the volatility of the oil. The ratio between the flow rates of the sweep gas and oil may then vary widely above the minimum at which, for a given control temperature, the gas is just saturated with the oil vapor.

In carrying out the method, it is preferred to limit the vaporization to about 80% of the oil supplied so that the low-volatile unvaporized residue will remain sufficiently fluid to wash and drain freely from the packing into the reservoir at the bottom of the tower. By thus limiting the degree of vaporization, it is possible to avoid the production of a viscous residue which clings to and fouls the packing, and the consequent necessity for frequent cleaning or replacement of the packing charge. The temperature and flow rate of the sweep gas are therefore so adjusted relative to the oil rate that, while the major portion of the oil is vaporized, there is a substantial unvaporized residue which is effective to keep the packing relatively clean.

As an example of the successful application of the invention to commercial operations, a system of the type illustrated in Fig. 2, embodying a steam heating unit and a vaporizing tower three feet in diameter and ten feet tall, has been used to produce a stable oil fog in gas mains extending as far as six to eight miles from the fogger by introducing oil at the rate of 5.0 gallons per hour into a stream of sweep gas having a flow rate of from 26,000 to 27,000 cubic feet per hour and a temperature of approximately 300° F. as indicated by the control point thermometer 35. The oil used was a high grade petroleum oil having a high percentage of paraffin hydrocarbons and a distillation range of 600-650° F. Under these conditions, about 80% of the oil supplied to the tower was vaporized and carried out as vapor by the sweep gas so as to provide a substantially constant fogging rate of about 4.0 gallons per hour. In this instance, the temperature of the sweep gas at thermometer 34 in line 19 was approximately 340° F., but it will be understood that the temperature at this point will be varied, according to the size and location of the vaporizing tower and the rate of flow of the sweep gas, as required to maintain the desired temperature at the control point where thermometer 35 is located.

With this installation, it was also found possible to vary the fogging rate from 4.0 gallons to as little as a fraction of one gallon per hour by merely adjusting the oil pumping rate of the pump 22, without making any change in the temperature or flow rate of the sweep gas. Fogging rates in excess of 4.0 gallons per hour could also be obtained by appropriate variation of the rate of flow of the sweep gas. Other installations embodying the arrangement of Fig. 1 have been successfully operated at oil rates of from 0.1 to 0.4 gallons per hour and sweep gas rates of from 800 to 2400 cubic feet per hour, with a vaporization of from 70% to 80% of the amount of oil supplied to the tower.

There is thus provided by the present invention a new and improved method and apparatus for producing oil fog of unusual stability and long travel in gas mains characterized by a number of advantages over the practices of the prior art. For example, the amount of fog produced may be accurately controlled by controlling only the rate at which the oil is added to the system, without the necessity for concomitant adjustments in the temperature and flow rate of the sweep gas. Another improvement is that, by the elimination of direct heating of the oil to produce vaporization, and by the continuous addition of fresh oil and removal of the unvaporized residue, carbonization of the oil is avoided and the residue cannot accumulate in the path of the gas stream and affect the fogging rate by decreasing the vapor pressure of the oil. A further advantage resides in the fact that the direct heating of the gas enables the attainment of adequate temperatures to vaporize a high percentage of the oil added to the system and to produce the sudden cooling necessary for creation of a fine-particle stable fog when the hot gas sweeps the oil vapors into the relatively cold gas stream in the main.

Although two specific structural embodiments of the invention have been described and illustrated in detail, it is to be expressly understood that these embodiments are exemplary only, and that various changes may be made in the construction, arrangement and functional characteristics of the different elements of the system, and in the operating conditions of the method, without departing from the inventive concept. Reference is therefore to be had to the appended claims for a definition of the limits of the invention.

What is claimed is:

1. A method of producing an oil fog in a stream of combustible fuel gas which includes the steps of dividing the gas stream into primary and secondary streams, heating the secondary gas stream, contacting fresh liquid oil, free of recirculated residue, with said heated secondary gas stream in in an enclosed space while passing said oil and gas through said space to effect vaporization of a portion, but not all, of the oil into said secondary gas stream, the unvaporized portion of the oil flowing out of said space after the limited period of contact with said secondary gas stream resulting from passage of the oil and gas through said space, discard the unvaporized oil flowing out of said space insofar as the production of oil fog is concerned, and then merging the heated secondary gas stream and entrained oil vapor with the primary gas stream to effect cooling and condensation of the vapor into minute oil droplets, whereby a stable oil fog is formed in the merged streams.

2. A method of producing an oil fog in a stream of combustible fuel gas which includes the steps of dividing the gas stream into primary and secondary streams, heating the secondary gas stream, passing fresh liquid oil, free of recirculated residue, at a predetermined rate through a vaporizing chamber in contact with said heated secondary gas stream, so controlling the temperature and rate of flow of said secondary gas stream with respect to the oil rate that the major portion, but not all, of the oil is vaporized by contact with the gas, the unvaporized portion of the oil flowing out of said chamber after contact with the secondary gas stream, discarding said unvaporized oil insofar as the production of oil fog is concerned, and then merging the heated secondary gas stream and entrained oil vapor with the primary gas stream to coil said secondary gas and condense the vapor into minute oil droplets, whereby a stable oil fog is formed in the merged streams.

3. A method of producing an oil fog in a stream of combustible fuel gas which includes the steps of dividing the gas stream into primary and secondary streams, heating the secondary gas stream, spraying fresh liquid oil, free of recirculated residue, into an enclosed space at a rate not exceeding about five gallons per hour, flowing said heated secondary gas stream through said space in contact with said oil, so controlling the temperature and rate of flow of said gas stream relative to the rate at which the oil is sprayed that the major portion, but not all, of the oil is vaporized by contact with the gas, flowing the unvaporized portion of the oil out of said space and discarding said oil insofar as the production of oil fog is concerned, and then merging the heated secondary gas stream and entrained oil vapor with the primary gas stream to cool and condense the vapor into minute oil droplets, whereby a stable oil fog is formed in the merged streams.

4. A method of producing a mixture of oil vapor and gas suitable for the production of an oil fog upon cooling including the steps of heating the gas while maintaining its composition substantially unchanged, continuously spraying fresh liquid oil, free of recirculated residue, into a stream of said heated gas at a predetermined rate, maintaining the temperature and rate of flow of said heated gas stream at such values that a substantial portion, but not all, of said oil is vaporized into the gas stream and the temperature of said stream after contact with and vaporization of said oil is between about 250° and 450° F., and continuously removing the unvaporized oil from further contact with the stream of heated gas.

5. A method of producing a mixture of oil vapor and gas suitable for the production of an oil fog upon cooling including the steps of heating the gas while maintaining its composition substantially unchanged, intermittently spraying fresh liquid oil, free of recirculated residue, at a predetermined rate into a vaporizing chamber containing a mass of packing, flowing said heated gas through said chamber in contact with the oil-wet surfaces of said packing, maintaining the temperature and rate of flow of said heated gas at such values that a substantial portion, but not all, of said oil is vaporized into the gas stream, removing the unvaporized oil from said chamber after contact with the heated gas, and discarding said unvaporized oil insofar as further use in the method is concerned.

6. A method of producing a mixture of oil vapor and gas suitable for the production of an oil fog upon cooling including the steps of heating the gas while maintaining its composition substantially unchanged, introducing fresh liquid oil, free of recirculated residue, into a vaporizing chamber adjacent the upper end thereof with flowing said oil downwardly through said chamber, flowing the heated gas upwardly through said chamber in contact with said oil to effect vaporization of a portion, but not all, of said oil into said gas, and removing the unvaporized portion of the oil when it reaches the lower end of said chamber and discarding it insofar as further use in the method is concerned.

7. Apparatus for producing an oil fog in a gas main including a conduit adapted to be connected to the gas main for delivering thereto a mixture of oil vapor and heated gas for the production of an oil fog upon cooling and dilution, a second conduit adapted to be connected to said gas main upstream of said first named conduit for withdrawing from the main the gas into which the oil vapor is to be introduced, means for heating the gas withdrawn from the main by said second conduit, an oil vaporizing chamber through which the heated gas is flowed, means for supplying liquid oil to said chamber and passing said oil therethrough in intimate contact with the heated gas, means for adjustably controlling the temperature of the heated gas, the rate at which the oil is supplied to said chamber and the rate of flow of the heated gas therethrough so that a substantial portion, but not all, of the oil is vaporized into said gas, an outlet from said chamber for the heated gas and admixed oil vapor connected to said first named conduit, a reservoir for receiving the unvaporized portion of the oil passing through said chamber, and a connection between said chamber and said reservoir for delivering unvaporized oil from the chamber to the reservoir, said reservoir having no connection with said chamber other than that through which the unvaporized oil is delivered so that further contact between said unvaporized oil and the heated gas is prevented.

8. Apparatus as defined in claim 7 wherein the means for supplying liquid oil to said chamber and passing said oil therethrough in intimate contact with the heated gas includes nozzle means for spraying the oil into said chamber and a mass of packing in said chamber for increasing the oil-wet surface presented to the heated gas.

9. Apparatus as defined in claim 7 including means within said chamber for separating liquid oil from the mixture of gas and oil vapor leaving said chamber through said outlet.

10. Apparatus as defined in claim 8 wherein said nozzle means sprays the oil into said chamber countercurrent to the flow of the heated gas therethrough.

11. Apparatus as defined in claim 8 wherein said nozzle means sprays the oil into said chamber in the same direction as the flow of the heated gas therethrough.

12. Apparatus for producing a mixture of oil vapor and heated gas suitable for the production of an oil fog upon cooling and dilution including means for heating the gas into which the oil vapor is to be introduced, an oil vaporizing chamber through which the heated gas is flowed, means for supplying liquid oil to said chamber and passing said oil therethrough in intimate contact with the heated gas, including nozzle means for spraying the oil into said chamber and a relatively tall column of packing below said nozzle means for increasing the oil-wet surface presented to the heated gas, means for adjustably controlling the temperature of the heated gas, the rate at which the oil is sprayed into said chamber and the rate of flow of the heated gas therethrough so that a substantial portion, but not all, of the oil is vaporized into said gas, an outlet from said chamber for the heated gas and admixed oil vapor, a relatively thin layer of packing positioned between said nozzle means and said outlet for separating liquid oil from the outgoing mixture of gas and oil vapor, a reservoir for receiving the unvaporized portion of the oil passing through said chamber, and a connection between said chamber and said reservoir for delivering unvaporized oil from said chamber to said reservoir, said reservoir having no connection with said chamber other than that through which the unvaporized oil is delivered so that further contact between said unvaporized oil and the heated gas is prevented.

References Cited in the file of this patent

UNITED STATES PATENTS

| Number | Name | Date |
| --- | --- | --- |
| 712,803 | Johnson | Nov. 4, 1902 |
| 1,971,721 | Kunberger | Aug. 28, 1934 |
| 1,993,311 | Shively | Mar. 5, 1935 |
| 1,993,315 | Blackwood | Mar. 5, 1935 |
| 1,993,316 | Blackwood et al. | Mar. 5, 1935 |
| 2,047,759 | Wingert | July 14, 1936 |
| 2,118,095 | McIntire | May 24, 1938 |